(12) United States Patent
Vick

(10) Patent No.: US 11,342,768 B2
(45) Date of Patent: May 24, 2022

(54) LOAD-BEARING STRAP WITH AN INDUCTIVE CHARGING SYSTEM

(71) Applicant: Aaron Vick, Madison, MS (US)

(72) Inventor: Aaron Vick, Madison, MS (US)

( * ) Notice: Subject to any disclaimer, the term of this patent is extended or adjusted under 35 U.S.C. 154(b) by 423 days.

(21) Appl. No.: 16/659,367

(22) Filed: Oct. 21, 2019

(65) Prior Publication Data

US 2021/0119459 A1  Apr. 22, 2021

(51) Int. Cl.
| | |
|---|---|
| *H02J 7/00* | (2006.01) |
| *H02J 7/02* | (2016.01) |
| *A45F 3/02* | (2006.01) |
| *A45F 3/04* | (2006.01) |
| *A45F 3/00* | (2006.01) |

(52) U.S. Cl.
CPC ............. *H02J 7/0045* (2013.01); *A45F 3/02* (2013.01); *A45F 3/04* (2013.01); *H02J 7/025* (2013.01); *A45F 2003/003* (2013.01)

(58) Field of Classification Search
CPC ........ H02J 7/0045; H02J 7/025; H02J 50/005; H02J 50/402; H02J 7/0042; H02J 50/10; A45F 3/02; A45F 3/04; A45F 2003/003; A45F 3/00; A45F 3/12; A45F 2004/003
See application file for complete search history.

(56) References Cited

U.S. PATENT DOCUMENTS

| | | | |
|---|---|---|---|
| 9,442,522 B2 * | 9/2016 | Tussy | G06F 1/163 |
| 10,547,036 B1 * | 1/2020 | Ashley | H01M 50/256 |
| 2015/0326044 A1 * | 11/2015 | Ashley | H02J 7/0042 |
| | | | 320/103 |
| 2017/0346307 A1 | 11/2017 | Azam | |
| 2020/0253349 A1 * | 8/2020 | Quartarone, III | H02J 7/0044 |

OTHER PUBLICATIONS

Visvo, https://www.the-spin-off.com/news/hitech/Stories-A-tech-filled-backpack-for-a-new-generation-13853.
WiTology Messenger Bag, https://xsreviews.co.uk/news/witology-unveil-their-smart-messenger-bag/.
LiveFree Backpack, https://www.kickstarter.com/projects/961207811/livefree-backpack-perfect-24-7-bag-with-wireless-c.
Barracuda Konzu: The Worlds Most Advanced Backpack, https://www.kickstarter.com/projects/barracuda/barracuda-konzu-the-worlds-most-advanced-backpack.

* cited by examiner

*Primary Examiner* — Stacy Whitmore

(57) ABSTRACT

A load-bearing strap with an inductive charging system is an apparatus that allows a user to charge a portable device, handsfree. The apparatus includes at least one strap, at least one pocket, a plurality of channels, and an inductive charging system. The inductive charging system is safely housed within the at least one strap as the at least one strap includes at least one charging chamber, a controller chamber, and a power source chamber. The at least one strap connects a bag about a user and houses the inductive charging system. The at least one pocket connects a portable device with the at least one strap. The plurality of channels connects the at least one charging chamber, the controller chamber, and the power source chamber with each other. The inductive charging system inductively charges a portable device with at least one set of coils, a microcontroller, and a power source.

18 Claims, 6 Drawing Sheets

LOAD-BEARING STRAP WITH AN INDUCTIVE CHARGING SYSTEM

FIELD OF THE INVENTION

The present invention generally relates to straps for bags and the like. More specifically, the present invention is a load-bearing strap with an inductive charging system.

BACKGROUND OF THE INVENTION

In present times, individual users and always seeking a more convenient means of providing power to their electronic devices. With the advent of a wide variety of portable electronic devices, the need has grown even greater. With ever-larger screens, more powerful processors, and generally more demanding applications, the batteries of these devices are constantly in a struggle to meet the demands of the user. It is not uncommon for a device to drain its internal power supply fully within a single day of use, requiring a significant down-time and forcing a user to interrupt their activities to find a power source. If the user does find a power source, they now contend with a staggering variety of possible port standards, connector types, current ratings; any mismatch of these standards could prevent the device from charging properly or may even damage the device. To illustrate, there are over a dozen "Universal Serial Bus" (USB) sockets spread across three major generations since 1996, not all of which are compatible with each other. Hardly universal; and this does not address additional standards like Thunderbolt, NEMA, SAE, coaxial connectors, and a multitude of other competing hardware standards. Solutions known in the art involve carrying external "brick" power packs; batteries encased in a protective shell designed to be carried in conjunction with the device being charged. This solution is cumbersome, effectively doubling the size of most devices while still not addressing the compatibility issue. Some solutions involve integrating these packs into wearable assemblies, but often use the same limiting connector set, or position a universal inductive charger out of direct reach of the user.

The present invention aims to offer a solution to this problem. The charging assembly described herein is a wearable series of straps, intended to be integrated into a backpack or similar product. Within these straps are positioned a series of inductive charging coils and an internal power supply. This assembly will wirelessly charge any device equipped to the Qi industry standard simply by placing the device in the pockets positioned along the straps. The Qi standard is nearly ubiquitous among major cell phone brands and can easily be retrofit to other devices with the installation of a thin conductive coil. The major drawback of known solutions, i.e. that the device had to be stored in inaccessible locations for charging, has been solved by placing the coils and storage pockets within easy reach of a user. The elastic pockets can fit a wide variety of devices, allowing them to be kept in proximity to the charging coils while also being easily accessible to the person wearing the straps.

DETAIL DESCRIPTIONS OF THE INVENTION

All illustrations of the drawings are for the purpose of describing selected versions of the present invention and are not intended to limit the scope of the present invention.

Figure 1:
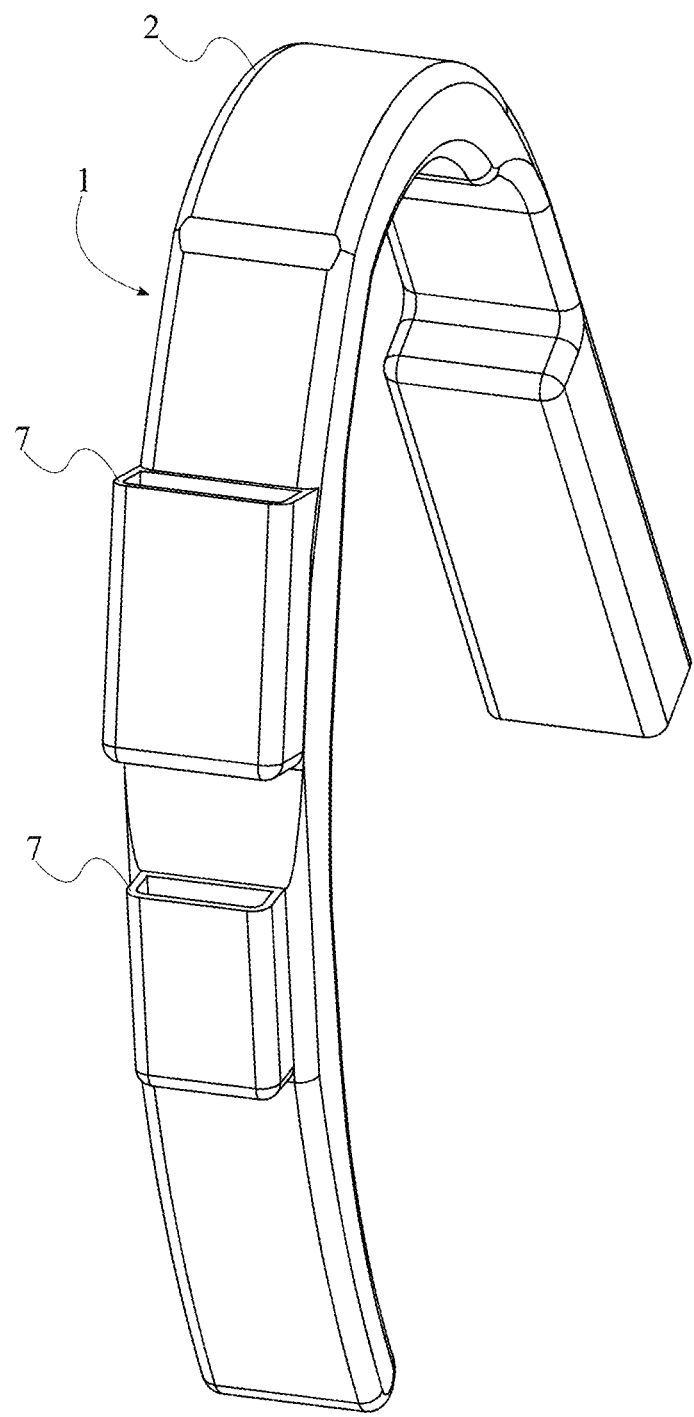
FIG. 1 is a perspective view of the present invention.

The present invention is a load-bearing strap with an inductive charging system that allows a user to fully charge at least one portable device on-the-go and handsfree. The portable device may include, but is not limited to, a smart phone, a music player, a tablet, and a smart watch. The present invention utilizes the position of a strap of bag that is preferably positioned around the body of a user and being worn by the user for quick and easy access to a portable device being charged with the present invention. The bag is preferably a backpack, and may also be a crossbody bag, a shoulder bag, and so on. It is also understood that straps of handheld bags may also be utilizes if the strap of the handheld bags provide the necessary width and thickness to house the present invention. In order for a user to easily access a portable device being charged with the present invention, the present invention comprises at least one strap 1, at least one pocket 7, a plurality of channels 8, and an inductive charging system 11, seen in FIG. 1 and FIG. 2. The at least one strap 1 supports and upholds a bag and the contents of the bag against the body of the user. The at least one strap 1 also upholds the at least one pocket 7 and a portable device housed within the at least one pocket 7. The at least one pocket 7 protects and positions a portable device against the inductive charging system 11. The plurality of channels 8 allows the inductive charging system 11 to be integrated throughout the at least one strap 1 with a plurality of leads. The inductive charging system 11 inductively charges a variety of portable devices so that the portable devices do not have to be directly connected with a portable battery with a cord and the present invention is able to serve as a universal charger for compatible devices.

Figure 5:
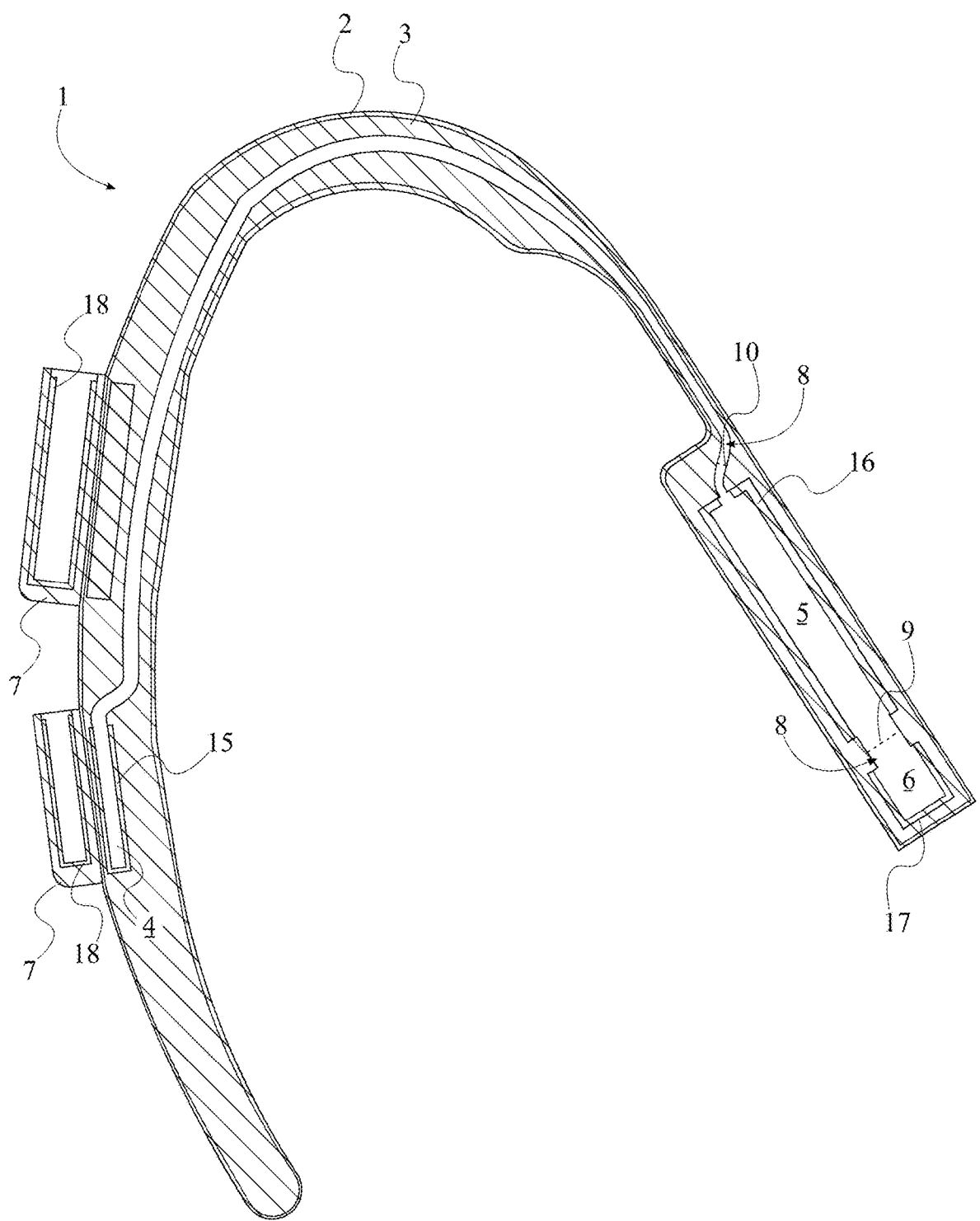
FIG. 5 is a cross-section view of FIG. 4 along line 5-5 of the present invention.

The at least one strap 1 comfortably rests on the body of a user and securely upholds both the load of a corresponding bag as the at least one strap 1 comprises an elongated casing 2 and a cushioning 3, shown in FIG. 5. The elongated casing 2 secures the bag about the body of a user. The cushioning 3 relieves the body of some of the weight against the body of the user. Furthermore, the cushioning 3 protects the inductive charging system 11 that is housed within the at least one strap 1 from any impact against the at least one strap 1. The at least one strap 1 effectively and safely houses the inductive charging system 11 as the at least one strap 1 comprises at least one charging chamber 4, a controller chamber 5, and a power source chamber 6.

Figure 2:
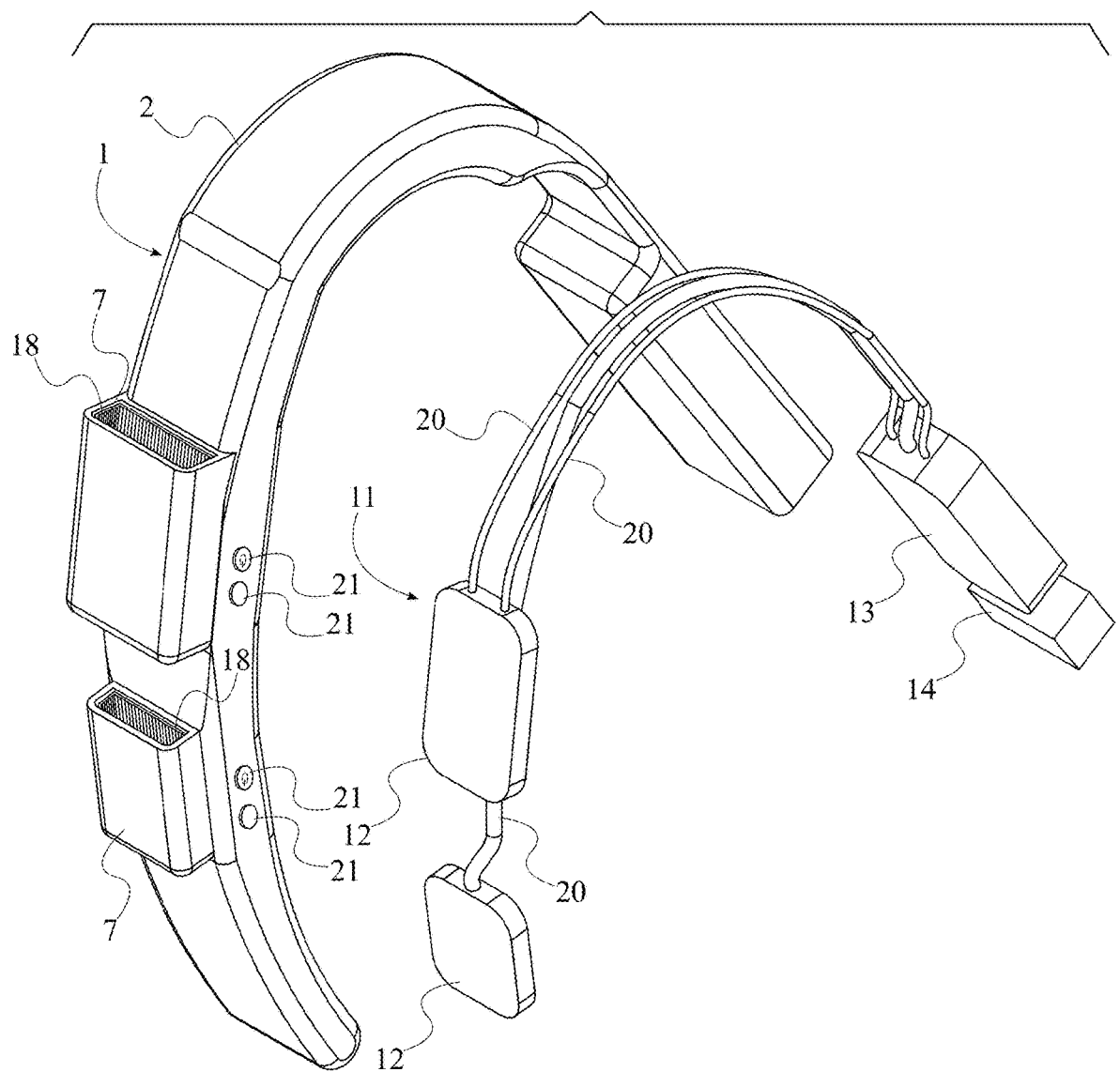
FIG. 2 is a front exploded view of the present invention.
Figure 3:
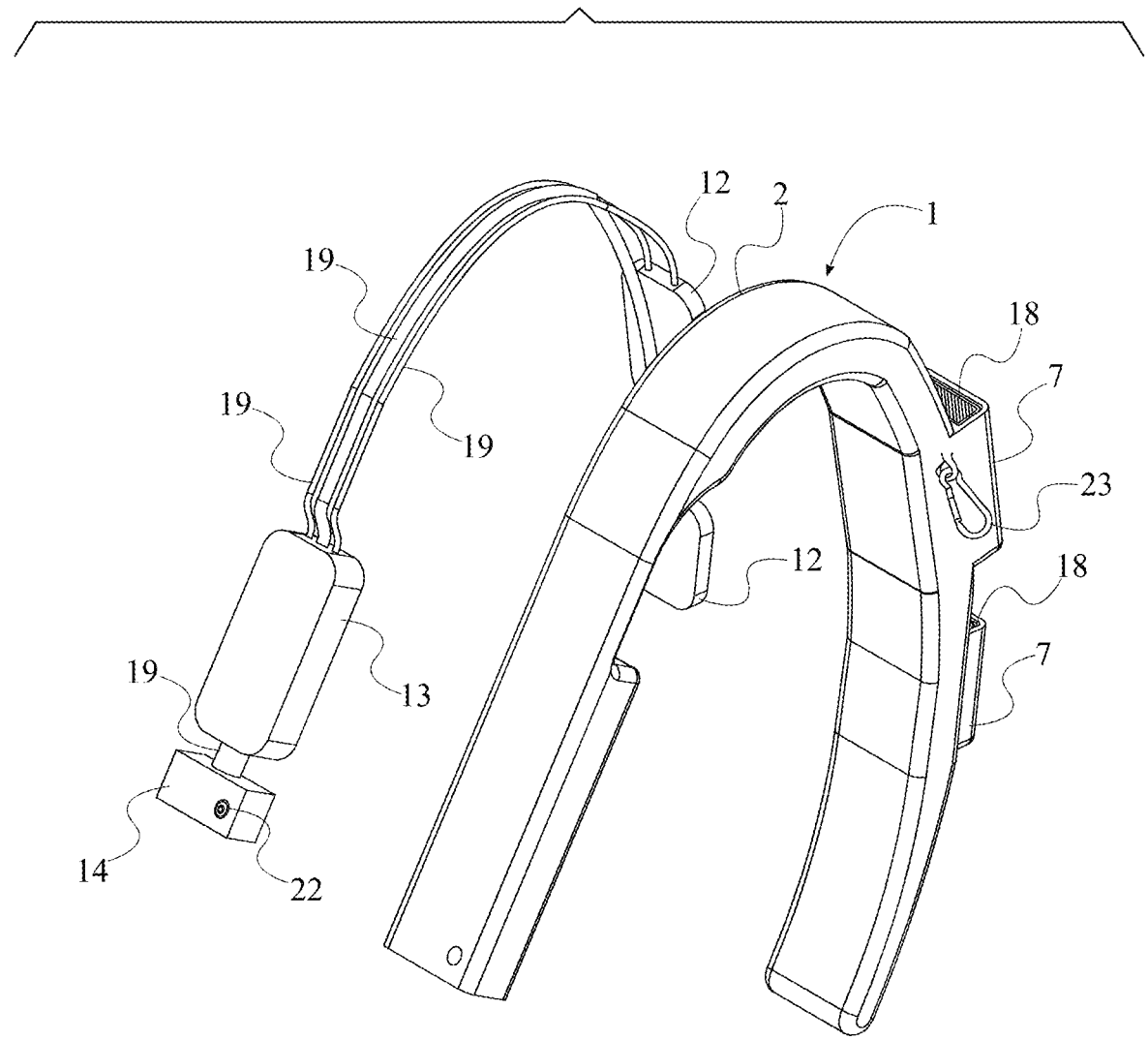
FIG. 3 is a rear exploded view of the present invention.
Figure 6:
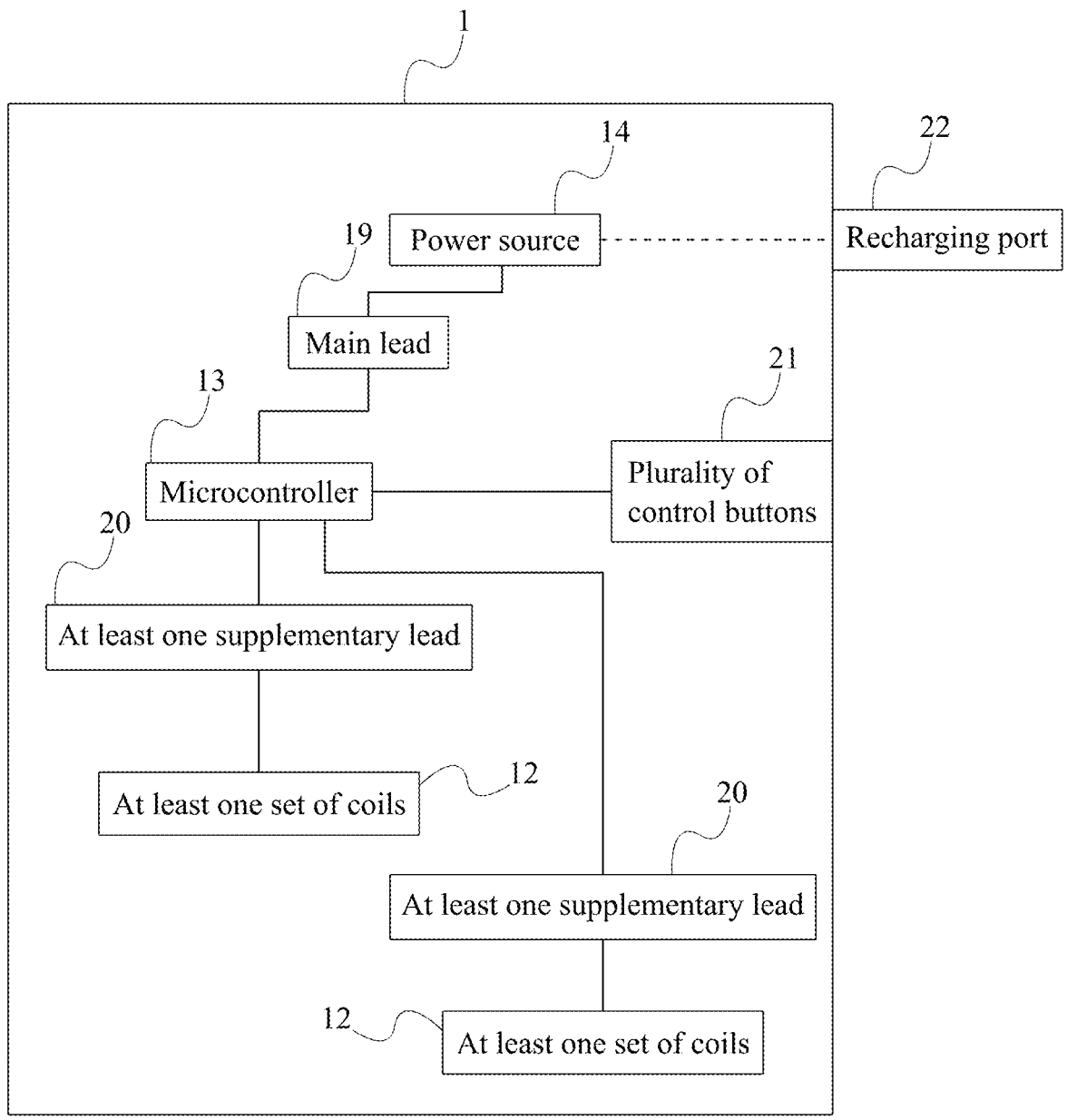
FIG. 6 is a schematic view of the electronic connections of the present invention.

In order to inductively charge a portable device with the inductive charging system 11, the inductive charging system 11 comprises at least one set of coils 12, a microcontroller 13, and a power source 14, seen in FIG. 2, FIG. 3, and FIG. 6. The at least one set of coils 12 inductively charges a portable device with power harnessed from the power source 14. The power source 14 is preferably a rechargeable portable battery. The microcontroller 13 allows a user to control the inductive charging system 11 and the delivery of power from the power source 14 to the at least one set of coils 12.

The overall arrangement of the aforementioned components effectively protects the inductive charging system 11 and securely positions a portable device along the body of a user with the present invention for easy accessibility. The at least one strap 1 supports both the load of a corresponding bag and the inductive charging system 11 as the cushioning 3 is positioned within and along the elongated casing 2, seen in FIG. 5. The plurality of channels 8, the at least one charging chamber 4, the controller chamber 5, and the power source chamber 6 are integrated within the cushioning 3 thereby securely protect the inductive charging system 11 within the at least one strap 1. The inductive charging system 11 is able to inductively charge a portable device as the plurality of channels 8 traverses through the controller chamber 5, the at least one charging chamber 4, and the power source chamber 6. This arrangement allows the at least one set of coils 12, the microcontroller 13, and the power source 14 to connect with one another through the cushioning 3. A portable device being charged with the present invention is easily accessible as the at least one pocket 7 is externally fixed along the elongated casing 2, seen in FIG. 1 and FIG. 2. The portable device positioned within the at least one pocket 7 is inductively charged with the inductive charging system 11 as the at least one charging chamber 4 is positioned adjacent to the at least one pocket 7, and the at least one set of coils 12 is positioned within the at least one charging chamber 4. Similarly, the microcontroller 13 is positioned within the controller chamber 5, and the power source 14 is positioned within the power source chamber 6, effectively protecting and positioning the microcontroller 13 and the power source 14 within the at least one strap 1. In order for the inductive charging system 11 to be managed and controlled, the microcontroller 13 is electronically connected with the at least one set of coils 12 and the power source 14. Moreover, the power source 14 is electrically connected with the microcontroller 13, providing the necessary power for the at least one set of coils 12.

The present invention is able to protect the inductive charging system 11 in a variety of environments and may be worn in outdoor setting while safely charging a portable device. In order to protect the inductive charging system 11, the present invention further comprises a first waterproof layer 15, a second waterproof layer 16, and a third waterproof layer 17, also shown in FIG. 5. The first waterproof layer 15, the second waterproof layer 16, and the third waterproof layer 17 shields the inductive charging system 11 from any precipitation. The first waterproof layer 15 lines the at least one charging chamber 4, protecting the at least one set of coils 12 from getting wet and preserves the integrity of the at least one set of coils 12. The second waterproof layer 16 lines the controller chamber 5, protecting the microcontroller 13 from getting wet and preserves the integrity of the microcontroller 13. The third waterproof layer 17 lines the power source 14 chamber 6, protecting the power source 14 from getting wet and preserves the integrity of the power source 14. The first waterproof layer 15, the second waterproof layer 16, and the third waterproof layer 17 preferably maintains a safe temperature within each respective chamber so that the at least one set of coils 12, the microcontroller 13, and the power source 14, respectively, do not overheat.

A portable device is securely housed within the at least one pocket 7 as the present invention further comprises a ribbed layer 18, seen in FIG. 2, FIG. 3, FIG. 4, and FIG. 5. The ribbed layer 18 increases the friction between the portable device and the interior of the at least one pocket 7 so that purposeful and significant force is required to remove the portable device from within the at least one pocket 7. The ribbed layer 18 is positioned within the at least one pocket 7 and is fixed across the at least one pocket 7, allowing the portable device to be positioned within and removed from the at least one pocket 7 by a user.

In order for the inductive charging system 11 to sufficiently charge a portable device with the power source 14, the present invention further comprises a main lead 19, and the plurality of channels 8 comprises a main channel 9, seen in FIG. 2, FIG. 3, FIG. FIG. 5, and FIG. 6. The main lead 19 directly connects the microcontroller 13 with the power source 14. The main channel 9 allows the main lead 19 to traverse through cushioning 3. More specifically, the main channel 9 traverses from the controller chamber 5 to the power supply chamber 6. The main lead 19 is positioned within the main channel 9, protecting the integrity of the main lead 19 within the at least one strap 1. The microcontroller 13 is electronically connected with the power source 14 by the main lead 19, allowing the microcontroller 13 to distribute the power from the power source 14.

In order for the microcontroller 13 to distribute the power from the power source 14 to the at least one set of coils 12, the present invention further comprises at least one supplementary lead 20, and the plurality of channels 8 comprises at least one supplementary channel 10, also seen in FIG. 2, FIG. 3, FIG. 5, and FIG. 6. The at least one supplementary lead 20 directly connects the microcontroller 13 with the at least one set of coils 12. The at least one supplementary channel 10 allows the at least one supplementary lead 20 to traverse through the cushioning 3. More specifically, the at least one supplementary channel 10 traverses from the controller chamber 5 to the at least one charging chamber 4. The at least one supplementary lead 20 is positioned within the at least one supplementary channel 10, protecting the integrity of the at least one supplementary lead 20 within the at least one strap 1. The microcontroller 13 is electronically connected within the at least one set of coils 12 by the at least one supplementary lead 20, allowing the at least one set of coils 12 to inductively charge a portable device.

Figure 4:
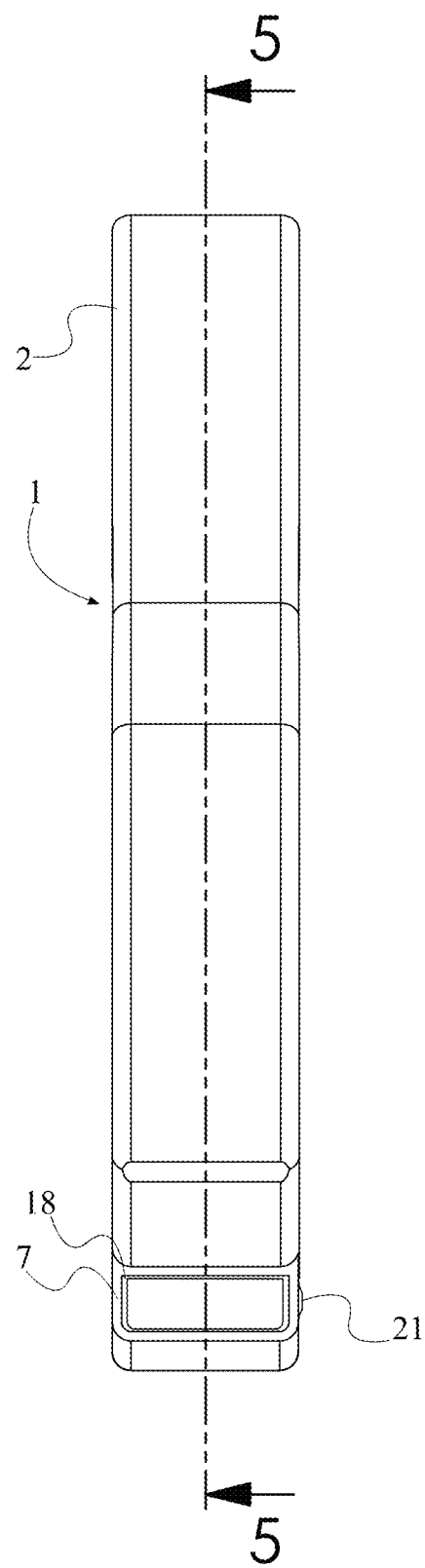
FIG. 4 is a top side view of the present invention.

The distribution of power for the at least one set of coils 12 is managed by a user with the microcontroller 13 as the present invention further comprises a plurality of control buttons 21, seen in FIG. 2, FIG. 4, and FIG. 6. The plurality of control buttons 21 may include, but is not limited to, a power button and a timer button. The plurality of control buttons 21 is also easily accessible by a user as the plurality of control buttons 21 is externally mounted onto the cushioning 3 and is pressed against the elongated casing 2. This arrangement also protects the plurality of control buttons 21 from the conditions of the surrounding environment and protects the plurality of control buttons 21 from precipitation. The plurality of control buttons 21 is electronically connected with the microcontroller 13, allowing a user to manually control the inductive charging system 11.

In order to replenish the power source 14, the present invention comprises a recharging port 22, seen in FIG. 3 and FIG. 6. The recharging port 22 allows a charging cable to connect the power source 14 to an external power source for recharging, allowing more portable devices to be inductively charged. The external power source may be an outlet, a larger portable power source, and another electronic device with more power supply. The recharging port 22 is externally mounted onto the elongated casing 2 so that a charging cable may directly connect with the power source 14 within the at least one strap 1. Moreover, the recharging port 22 is electrically connected to the power source 14, allowing the power source 14 to harness power from an external power source.

The present invention also enhances the convenience of the at least one strap 1. A user is quickly and easily able to connect a variety of accessories with the at least one strap 1 as the present invention further comprises at least one fastener 23, also shown in FIG. 3. The at least one fastener 23 may be a belt with a buckle that securely fastens a bag about the body of a user, a carabiner for attaching a variety of items, a keyholder, and so on. The at least one fastener 23 is externally mounted onto the elongated casing 2, preferably positioned adjacent the at least one pocket 7 for easy accessibility.

Although the invention has been explained in relation to its preferred embodiment, it is to be understood that many other possible modifications and variations can be made without departing from the spirit and scope of the invention as hereinafter claimed.

What is claimed is:

1. A load-bearing strap with an inductive charging system comprises:
    at least one strap;
    at least one pocket;
    a plurality of channels;
    an inductive charging system;
    the at least one strap comprises an elongated casing, a cushioning, at least one charging chamber, a controller chamber, and a power source chamber;
    the inductive charging system comprises at least one set of coils, a microcontroller, and a power source;
    the cushioning being positioned within and along the elongated casing;
    the plurality of channels, at least one charging chamber, the controller chamber, and the power source chamber being integrated within the cushioning;
    the plurality of channels traversing through the controller chamber, the at least one charging chamber, and the power source chamber;
    the at least one pocket being externally fixed along the elongated casing;
    the at least one charging chamber being positioned adjacent to the at least one pocket;
    the at least one set of coils being positioned within the at least one charging chamber;
    the microcontroller being positioned within the controller chamber;
    the power source being positioned within the power source chamber;
    the microcontroller being electronically connected with the at least one set of coils and the power source; and,
    the power source being electrically connected with the microcontroller.

2. The load-bearing strap with an inductive charging system as claimed in claim 1 comprises:
    a first waterproof layer; and,
    the first waterproof layer lining the at least one charging chamber.

3. The load-bearing strap with an inductive charging system as claimed in claim 1 comprises:
    a second waterproof layer; and,
    the second waterproof layer lining the controller chamber.

4. The load-bearing strap with an inductive charging system as claimed in claim 1 comprises:
    a third waterproof layer; and,
    the third waterproof layer lining the power source chamber.

5. The load-bearing strap with an inductive charging system as claimed in claim 1 comprises:
    a ribbed layer;
    the ribbed layer being positioned within the at least one pocket; and,
    the ribbed layer being fixed across the at least one pocket.

6. The load-bearing strap with an inductive charging system as claimed in claim 1 comprises:
    a main lead;
    the plurality of channels comprises a main channel;
    the main channel traversing from the controller chamber to the power supply chamber;
    the main lead being positioned within main channel; and,
    the microcontroller being electronically connected with the power source by the main lead.

7. The load-bearing strap with an inductive charging system as claimed in claim 1 comprises:
    at least one supplementary lead;
    the plurality of channels comprises at least one supplementary channel;
    the at least one supplementary channel traversing from the controller chamber to the at least one charging chamber;
    the least one supplementary lead being positioned within least one supplementary channel; and,
    the microcontroller being electronically connected with the least one set of coils by the least one supplementary lead.

8. The load-bearing strap with an inductive charging system as claimed in claim 1 comprises:
    a plurality of control buttons;
    the plurality of control buttons being externally mounted onto the cushioning;
    the plurality of control buttons being pressed against the elongated casing; and,
    the plurality of control buttons being electronically connected with the microcontroller.

9. The load-bearing strap with an inductive charging system as claimed in claim 1 comprises:
    a recharging port;
    the recharging port being externally mounted onto the elongated casing; and,
    the recharging port being electrically connected to the power source.

10. The load-bearing strap with an inductive charging system as claimed in claim 1 comprises:
    at least one fastener; and,
    the at least one fastener being externally mounted onto the elongated casing.

11. A load-bearing strap with an inductive charging system comprises:
    at least one strap;
    at least one pocket;
    a plurality of channels;
    an inductive charging system;
    a main lead;
    at least one supplementary lead;
    the at least one strap comprises an elongated casing, a cushioning, at least one charging chamber, a controller chamber, and a power source chamber;
    the inductive charging system comprises at least one set of coils, a microcontroller, and a power source;
    the plurality of channels comprises a main channel and at least one supplementary channel;
    the cushioning being positioned within and along the elongated casing;
    the plurality of channels, at least one charging chamber, the controller chamber, and the power source chamber being integrated within the cushioning;
    the plurality of channels traversing through the controller chamber, the at least one charging chamber, and the power source chamber;

the at least one pocket being externally fixed along the elongated casing;

the at least one charging chamber being positioned adjacent to the at least one pocket;

the at least one set of coils being positioned within the at least one charging chamber;

the microcontroller being positioned within the controller chamber;

the power source being positioned within the power source chamber;

the microcontroller being electronically connected with the at least one set of coils and the power source;

the power source being electrically connected with the microcontroller;

the main channel traversing from the controller chamber to the power supply chamber;

the main lead being positioned within main channel;

the microcontroller being electronically connected with the power source by the main lead;

the at least one supplementary channel traversing from the controller chamber to the at least one charging chamber;

the least one supplementary lead being positioned within least one supplementary channel; and, the microcontroller being electronically connected with the least one set of coils by the least one supplementary lead.

12. The load-bearing strap with an inductive charging system as claimed in claim 11 comprises:
a first waterproof layer; and,
the first waterproof layer lining the at least one charging chamber.

13. The load-bearing strap with an inductive charging system as claimed in claim 11 comprises:
a second waterproof layer; and,
the second waterproof layer lining the controller chamber.

14. The load-bearing strap with an inductive charging system as claimed in claim 11 comprises:
a third waterproof layer; and,
the third waterproof layer lining the power source chamber.

15. The load-bearing strap with an inductive charging system as claimed in claim 11 comprises:
a ribbed layer;
the ribbed layer being positioned within the at least one pocket; and,
the ribbed layer being fixed across the at least one pocket.

16. The load-bearing strap with an inductive charging system as claimed in claim 11 comprises:
a plurality of control buttons;
the plurality of control buttons being externally mounted onto the cushioning;
the plurality of control buttons being pressed against the elongated casing; and,
the plurality of control buttons being electronically connected with the microcontroller.

17. The load-bearing strap with an inductive charging system as claimed in claim 11 comprises:
a recharging port;
the recharging port being externally mounted onto the elongated casing; and,
the recharging port being electrically connected to the power source.

18. The load-bearing strap with an inductive charging system as claimed in claim 11 comprises:
at least one fastener; and,
the at least one fastener being externally mounted onto the elongated casing.

* * * * *